Feb. 2, 1932.   J. F. MOSE   1,843,458
CAN WRAPPING AND KEY PLACING MACHINE
Filed Oct. 14, 1929   6 Sheets-Sheet 1
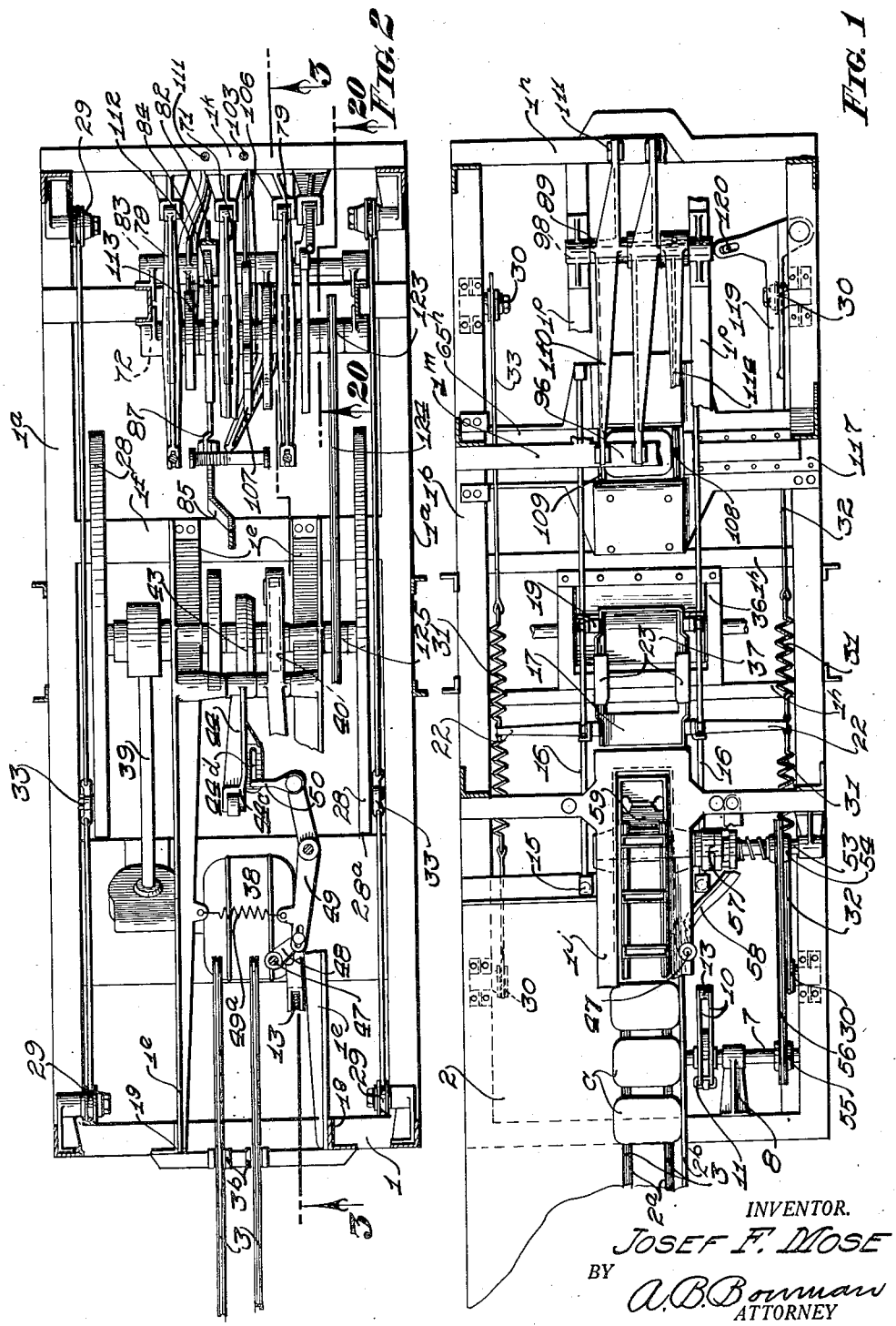
INVENTOR.
JOSEF F. MOSE
BY
A.B.Bowman
ATTORNEY

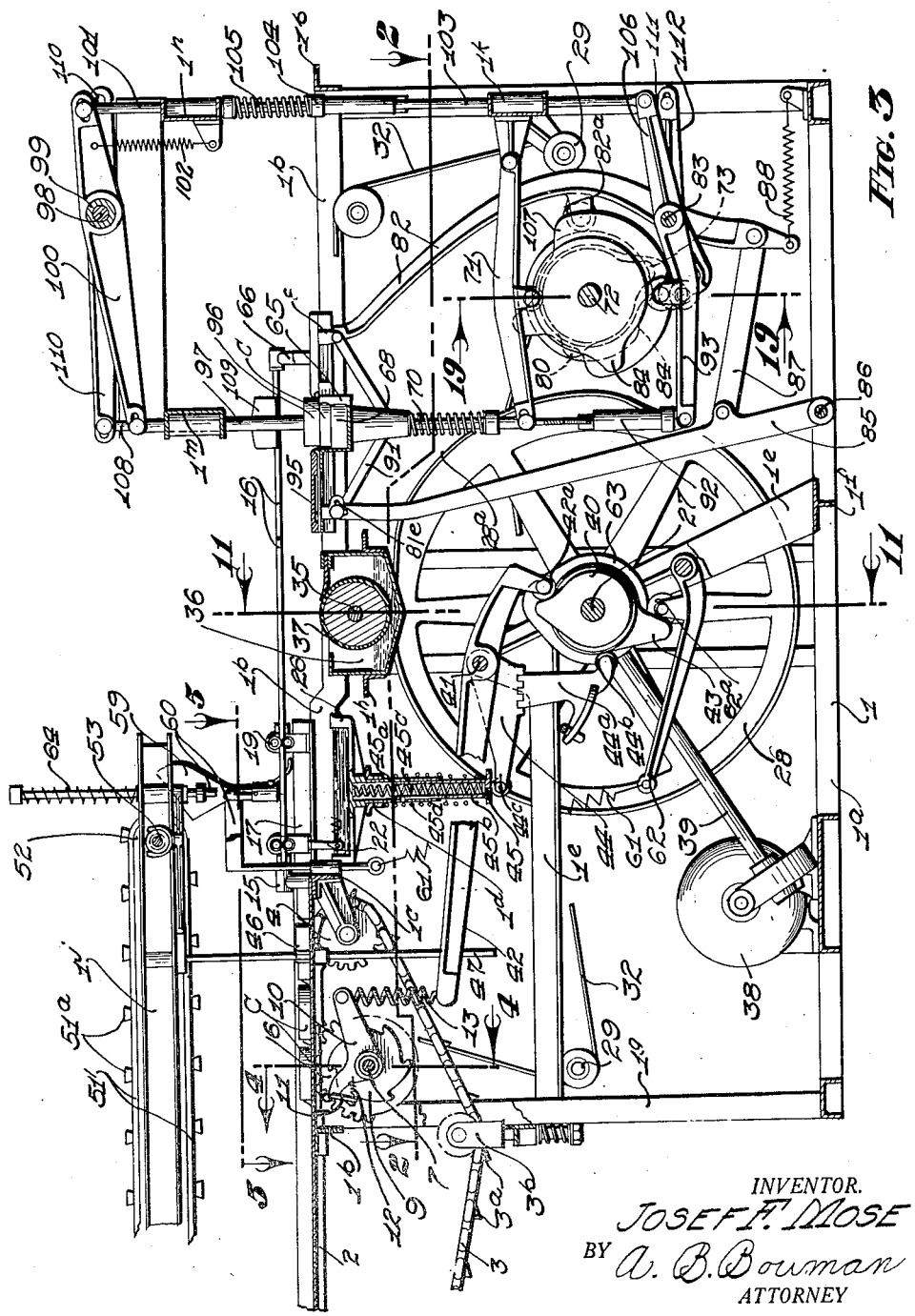

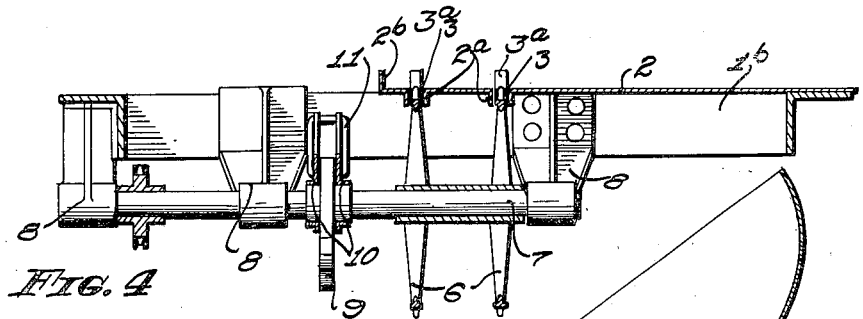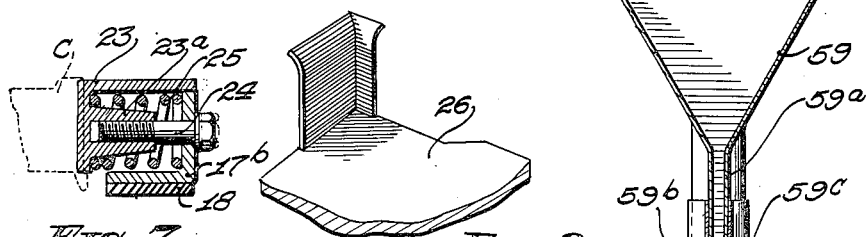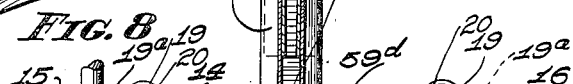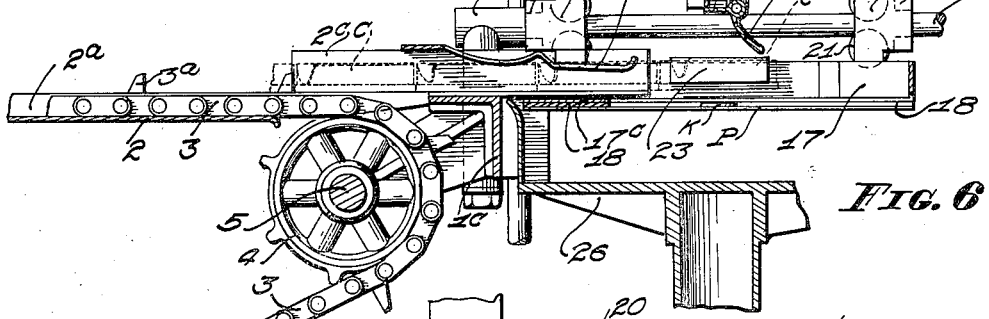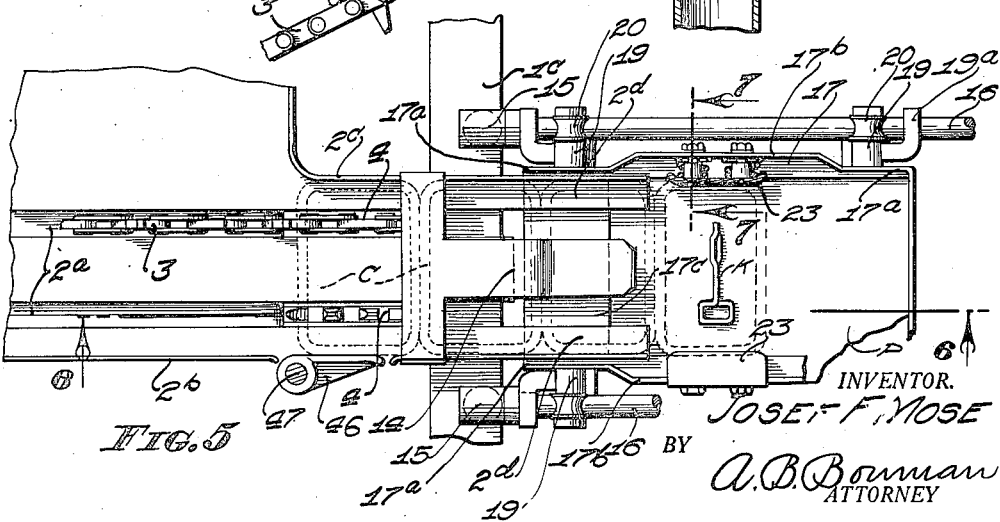

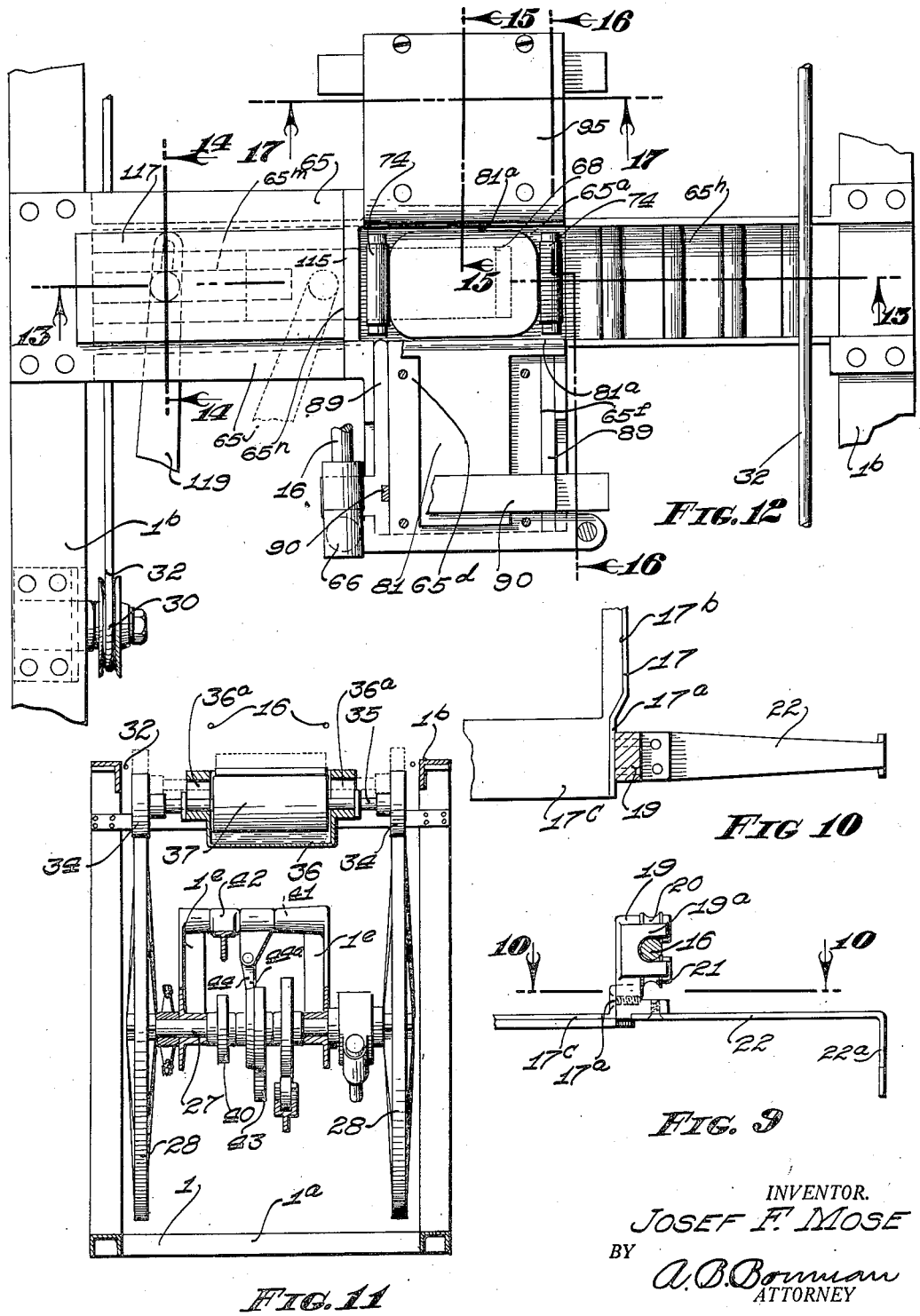

Feb. 2, 1932.    J. F. MOSE    1,843,458
CAN WRAPPING AND KEY PLACING MACHINE
Filed Oct. 14, 1929    6 Sheets-Sheet 5
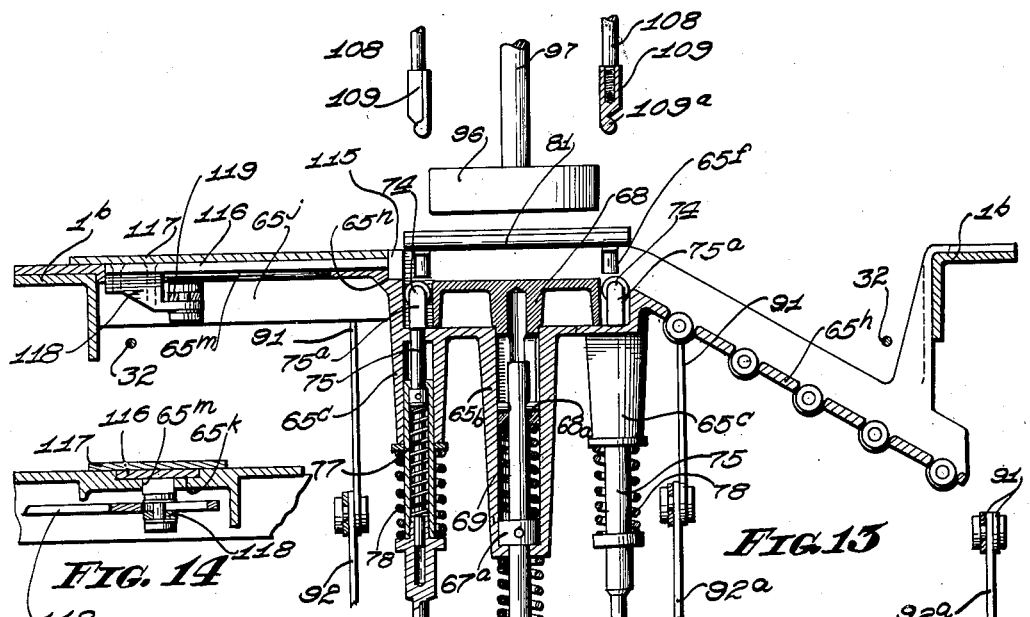
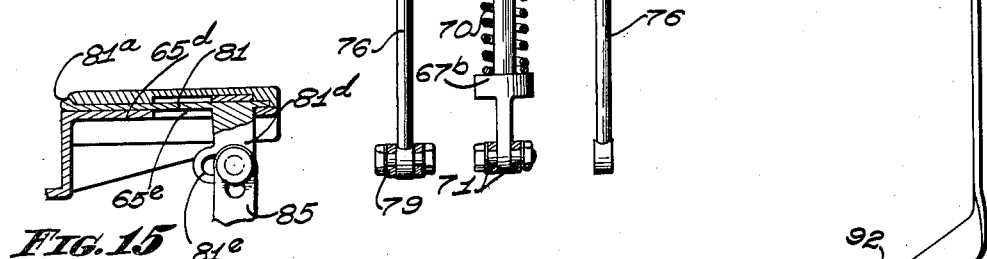
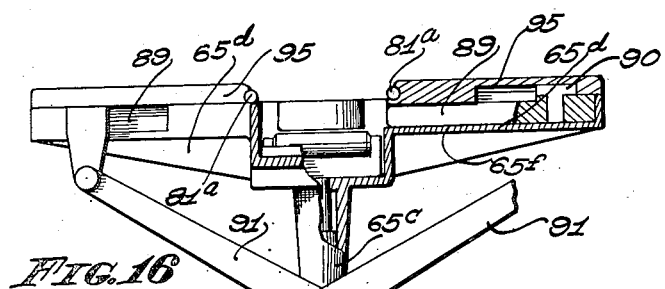
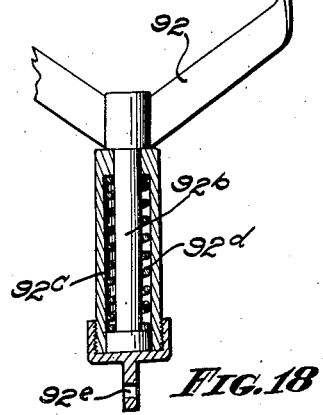
INVENTOR.
JOSEF F. MOSE
BY A. B. Bowman
ATTORNEY

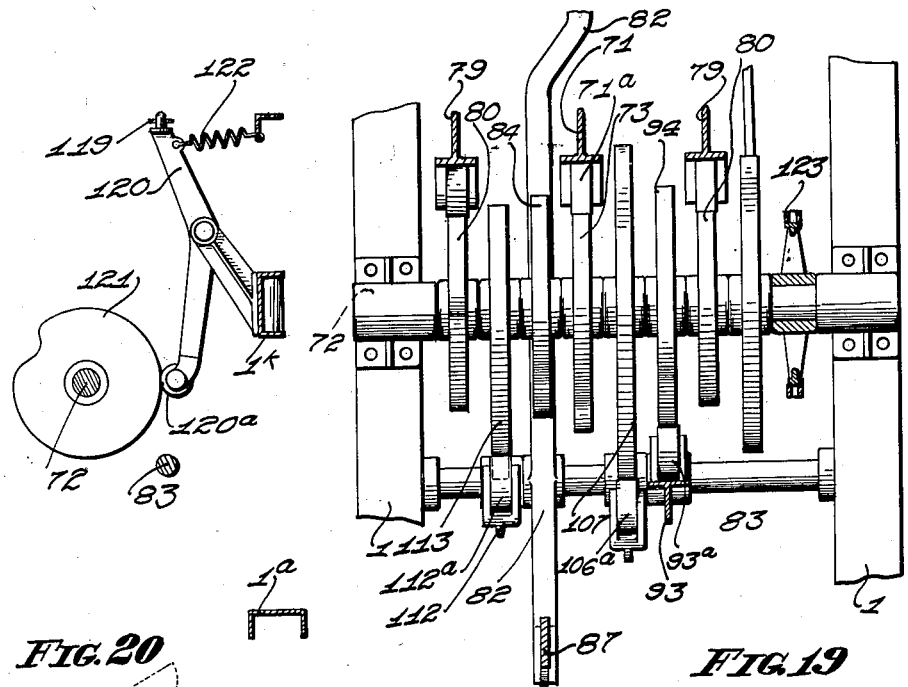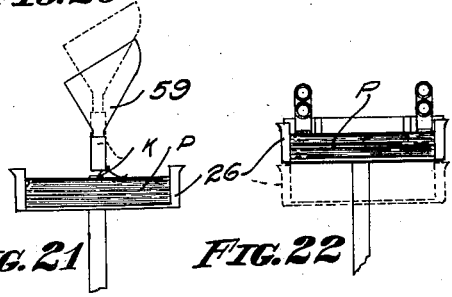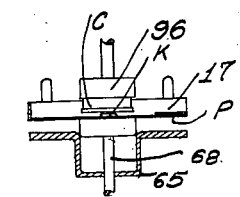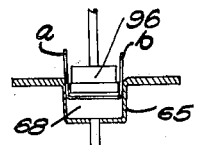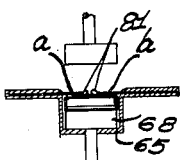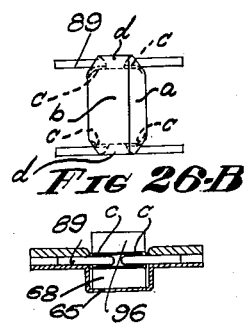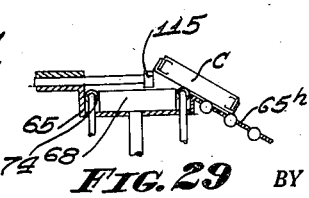

Patented Feb. 2, 1932

1,843,458

UNITED STATES PATENT OFFICE

JOSEF F. MOSE, OF SAN DIEGO, CALIFORNIA

CAN WRAPPING AND KEY PLACING MACHINE

Application filed October 14, 1929. Serial No. 399,487.

My invention relates to key-placing and can-wrapping machines, and the objects of my invention are: First, to provide a machine of this class which is especially adapted for wrapping rectangular shaped cans or packages, such as the conventional sardine can; second, to provide a machine of this class which eliminates to the need of wrapping this shape of can by hand; third, to provide a machine of this class in which all possible moving parts are yieldable to forces greater than those needed to handle and wrap the cans, thereby eliminating the danger of injury to the operator should his hand or clothes become caught in the machine and also preventing damage to the machine; fourth, to provide a machine of this class in which neither the paper for wrapping the cans nor the key to be placed thereon is delivered unless a can is in certain relation to the paper, thus preventing the keys and paper clogging up a machine should cans not be fed in rapidly enough; fifth, to provide a machine of this class in which the adhesive is coated only on the portion of the paper needing it thereby eliminating smearing of the paper or depositing adhesive where it might interfere with the wrapping of the cans; sixth, to provide a machine of this class in which the various operations can be readily watched so as to prevent the machine from clogging; and seventh, to provide on the whole, a novelly constructed key-placing and can-wrapping machine which is simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a plan view of my machine, with parts and portions shown in section, broken away, or removed to facilitate the illustration; Fig. 2 is a sectional view in plan, taken through 2—2 of Fig. 3, with parts and portions in elevation or removed to facilitate the illustration; Fig. 3 is a sectional view substantially through 3—3 of Fig. 2, with parts and portions shown in elevation to facilitate the illustration; Fig. 4 is an enlarged fragmentary sectional view through 4—4 of Fig. 3, with parts and portions shown in elevation to facilitate the illustration; Fig. 5 is a further enlarged fragmentary elevational view, through 5—5 of Fig. 3, with parts and portions shown in section to facilitate the illustration; Fig. 6 is another enlarged fragmentary sectional view, through 6—6 of Fig. 5; Fig. 7 is a still further enlarged fragmentary sectional view, through 7—7 of Fig. 5, showing in detail the can-engaging portions of the carriage mechanism; Fig. 8 is a fragmentary perspective view illustrating one corner of the platen; Fig. 9 is a fragmentary end view of the carriage means; Fig. 10 is a fragmentary sectional view thereof, through 10—10 of Fig. 9; Fig. 11 is a sectional view through 11—11 of Fig. 3, with parts and portions shown in elevation to facilitate the illustration; Fig. 12 is an enlarged fragmentary plan view of the wrapping mechanism of my machine, with parts and portions broken away and in section, or removed, to facilitate the illustration; Fig. 13 is a sectional view thereof, through 13—13 of Fig. 12, with parts and portions shown in elevation, or shown fragmentarily to facilitate the illustration; Fig. 14 is a fragmentary sectional view through 14—14 of Fig. 12; Fig. 15 is a fragmentary sectional view through 15—15 of Fig. 12; Fig. 16 is a sectional view through 16—16 of Fig. 12, with parts and portions shown in elevation to facilitate the illustration; Fig. 17 is a sectional view through 17—17 of Fig. 12; Fig. 18 is a fragmentary elevational view, showing the coupling means for the sliding bars; Fig. 19 is a slightly enlarged sectional view through 19—19 of Fig. 3, with parts and portions shown in elevation to facilitate the illustration ; Fig. 20 is an enlarged fragmentary sectional view through 20—20 of Fig. 2, with parts and portions broken away, removed, or shown in section to facilitate the illustration; Fig. 21 is a diagrammatical view illustrating the key-placing operation; Fig. 22 is another diagrammatical view, illustrating the wrapping paper placing operation; and Figs. 23, 24, 25, 26A, 26B, 27, 28 and 29 illustrate the several steps of the can-wrapping operation.

Similar characters of reference refer to similar parts and portions throughout the several views of the drawings.

Frame 1, table 2, conveyor chains 3, idler sprockets 4, axle 5, drive sprocket wheels 6, shaft 7, bracket bearings 8, ratchet wheel 9, levers 10, dog member 11, spring 12, link spring 13, leaf spring 14, post members 15, carriage tracks 16, carriage frame 17, pad 18, roller brackets 19, upper rollers 20, lower rollers 21, arms 22, clamp members 23, pins 24, springs 25, platen 26, main shaft 27, carriage driving wheels 28, lower idler pulleys 29, upper idler pulleys 30, equalizer springs 31, carriage drive cables 32, swivel fitting 33, driven wheels 34, shaft 35, adhesive container 36, roller 37, motor 38, gear and shaft arrangement 39, can conveyor operating cam 40, shaft 41, can conveyor operating lever 42, platen operating cam 43, platen operating lever 44, platen lifting means 45, arm member 46, arm 47, rod 48, lever 49, link 50, conveyor chains 51, conveyor chain sprockets 52, shaft 53, sprockets 54 and 55, chain 56, clutch means 57, lever 58, hopper 59, hopper actuating rods 60, link springs 61, cam lever 62, hopper shifting cam 63, hopper return springs 64, wrapping table 65, forward track supporting posts 66, linking rod 67, lower plunger 68, spring 69, spring 70, lower plunger actuating lever 71, cam shaft 72, lower plunger actuating cam 73, lower end flap-folding rollers 74, rods 75, connecting rods 76, compensating springs 77, return springs 78, levers 79, cams 80, can-enveloping sliding plates 81, forward sliding plate lever 82, lever shaft 83, sliding plate cam 84, rear sliding plate lever 85, shaft 86, link member 87, tension spring 88, corner-folding sliding bars 89, linking bars 90, linking member 91, coupling means 92, lever 93, cam 94, cover plates 95, upper plunger 96, upper plunger rod 97, shaft 98, second shaft 99, lever 100, rod 101, spring 102, continuing rod 103, sliding joint 104, compensating spring 105, lever 106, upper plunger operating cam 107, rods 108, upper end flap-folding members 109, upper lever 110, connecting means 111, lower lever 112, cam 113, arm 114, ejecting plunger 115, bar 116, plate 117, arm member 118, lever 119, lever 120, ejecting plunger operating cam 121, spring 122, sprocket wheel 123, chain 124, and sprocket wheel 125 constitute the principal parts and portions of my novel key-placing and can-wrapping device.

A substantially rectangular frame 1 is provided, having suitable supports and cross members for mounting the various elements of the machine. The frame includes a rectangular lower or base frame 1a, and an upper frame 1b, spaced apart therefrom by suitably located vertical posts. At the one end of the upper frame and extending rearwardly therefrom is a table 2.

Provided therein, at equal distances from each side of the longitudinal axis of the frame are a pair of channels 2a which receive suitable conveyor chains 3. At the forward or inner end of the table 2, the bottoms of the channels 2a are cut away so that idler sprockets 4 may engage the chains 3, as shown in Figs. 3, 5 and 6.

The idler sprockets 4 are mounted on a shaft 5, which is in turn supported by bracket bearings extending from a cross member 1c of the frame 1. The cross member 1c also supports the forward or inner end of the table 2. Rearwardly of the idler sprockets 4, there is positioned a pair of driving sprocket wheels 6, which are also arranged to engage the conveyor chains 3 through openings provided in the bottoms of the channels 2a, as shown best in Fig. 4. The drive sprockets 6 are mounted on a shaft 7 which is in turn supported by bracket bearings 8, extending from the upper frame 1b at the rear end portion thereof.

Mounted on the shaft 7, to the one side of the driving sprockets 6, is a ratchet wheel 9. A pair of substantially L-shaped levers are journaled at the juncture of their leg portions on either side of the ratchet wheel 9. A loop member 11 is secured at its one end between the corresponding legs of levers 10 so that the other end of said loop member is in engageable relation with the teeth of the ratchet wheel 9. A spring 12 maintains the other or lower end of the loop 11 in engagement with said ratchet wheel. The other legs of the levers 10 extend forwardly and upwardly from the ratchet wheel 9 where they are connected to a spring 13, which functions as a link member between the ratchet wheel and the operating mechanism therefor, which is described hereinafter. The spring 13 is made strong enough to yield only should abnormal strains be placed upon the conveyor chains or the connecting mechanism.

Certain links of the conveyor chains 3 are provided with lugs 3a which extend above the channels 2a, as shown in Figs. 3, 4 and 6. The lugs 3a are spaced far enough apart to receive the cans or packages to be wrapped.

The structure shown is designed for wrapping the conventional rectangular sardine can C having rounded corners. The cans ride on or just clear of the surface of the table 2 and are moved along by the lugs 3a. The table 2 is provided with an upturned portion forming a rail 2b, which extends longitudinally with the channels 2a a suitable distance to the one side thereof. The rail 2b enables the cans C to be properly centered relative to the conveyor chains 3a.

In order to keep the conveyor chains 3 taut, tension sprockets 3b are supported at the rear end of the frame 1 so as to hold the return portions of the conveyor chains clear of the drive sprockets 6.

Adjacent the forward end of the table 2, said table is provided with a second upwardly extending rail or guide 2c, which is on the opposite side of the conveyor chains from the guide 2b, and is spaced therefrom a distance equal to the length of the can, as shown best in Fig. 5.

The table 2 extends forwardly of the cross member 1c and forms a feeding portion 2d, the guard walls 2b and 2c of which form the outer margins. Supported over the feeding portion 2d, at its rear end, is a leaf spring 14, which extends forwardly so as to engage the upper sides of the cans C and prevent them from overriding one another.

Mounted upon the cross member 1c on either side of the feeder portion 2d are a pair of post members 15, which support the rear ends of a pair of rails 16. A carriage means is supported by and adapted to travel upon the rails 16.

The carriage means includes a frame 17 of substantially rectangular shape. The outer margins of the frame 17 conform to the shape of the can-wrapping paper P. As the width of the paper is reduced adjacent its ends, to facilitate wrapping, the sides of the carriage 17 adjacent its ends are reduced in width, as indicated by 17a. The side walls 17b of the carriage frame 17 are substantially L-shaped in cross section, as shown best in Fig. 7, with the one leg extending horizontally and forming the under side of the carriage. The horizontal portions of the side members 17b are connected together at their rear ends by a web 17c. Secured to the under side of the web 17c and the horizontal portions of the side members 17b, is a pad 18, under which an adhesive is coated by another part of my machine prior to pressing the wrapping paper against the pad by a suitable platen to be described hereinafter.

Adjacent the ends of each side member 17b is a bracket 19, which supports an upper roller 20 and a lower roller 21. These rollers ride on the upper and lower sides, respectively, of the tracks 16, as shown best in Figs. 6 and 9. Extending from the one side of each bracket 19 is an arm 19a, which straddles the corresponding track 16, and is adapted to engage the posts 15 at the rear ends of the tracks 16 or other posts at the forward ends of the tracks.

The rear pair of brackets 19, that is, the ones adjacent the posts 15, have secured to their lower side, outwardly extending arms 22, which reach almost to the side members of the upper frame 1b, where they are provided with depending portions 22a.

Suitable driving means, which is described hereinafter, is connected to these arms 22a, so as to shift the carriage means back and forth along the track 16.

Centered relative to the ends of the carriage frame 17 and supported by the vertical walls of the side portions 17b thereof, is a pair of clamp members 23. These clamp members are held relative to the side portions 17b by means of pins 24, which may be in the form of bolts secured in boss portions 23a provided in the clamp members 23, as shown best in Figs. 5 and 7. Springs 25 tend to hold the clamp members 23 inward from their respective side members 17b, as shown best in Fig. 7. The inner vertically extending faces of the clamp members 23 are adapted to yieldably engage the ends of a can. When the carriage is in the position shown in Figs. 3, 5, and 6, the feeding portion 2d of the table 2 overhangs the carriage frame and terminates adjacent to the rear ends of the clamp members 23. Movement of the conveyor chains 3 forces the cans C, one at a time, between the clamp members 23, as indicated by the dotted lines in Fig. 5.

Reciprocatively supported by a cross member 1d of the frame 1 so as to be centered under the carriage 17 when said carriage is in its rear position shown in Figs. 1, 3, 5 and 6, is a platen member 26. The platen is caused to reciprocate during predetermined intervals by a mechanism which is described hereinafter.

Supported within the side margins of the frame 1 are a pair of bracket frames 1e, which are secured at their forward ends to a cross member 1f positioned a short distance forwardly of the central portion of the main frame 1 and joining the side members of the base frame 1a. From this cross member the bracket frames 1e extend upwardly and rearwardly and then horizontally and rearwardly to upright members 1g at the rear end of the main frame 1, as shown best in Figs. 2 and 3. The bracket frames 1e support a main shaft 27, which is positioned in approximately centered relation to the ends of the main frame and extends transversely. Mounted at the ends of the main shaft 27, is a pair of carriage shifting wheels 28, which have a diameter somewhat greater than the travel of the carriage means.

Mounted at the forward and rear corners of the main frame 1, at approximately the same level as the main shaft, are four lower idler pulleys 29. Mounted above the idler pulleys 29, inwardly from the ends of the frame 1, is another set of four idler pulleys 30. The second set of idler pulleys 30 is substantially in alinement with the depending portions 22a of the arms 22.

Extending in opposite directions from each depending portion 22a is a pair of equalizer springs 31. To the extended ends of each set of equalizer springs are secured the ends of a cable 32. Said cable passes over the corresponding idler pulleys 30 and 29, and is secured to a swivel fitting 33 mounted on the outer side of the corresponding carriage driving wheel 28. The periphery of each carriage driving wheel 28 forms an adhesive spreader drive cam 28a. The adhesive spreading means includes a pair of driven wheels 34 mounted at the ends of a shaft 35, and adapted to ride upon the rim of carriage driving wheels, as shown best in Fig. 11. Supported between the side members of the main frame 1, by means of cross members 1h, is an adhesive container 36. The side walls of the container 36 are provided with slots 36a through which extends the shaft 35. Mounted within the container and upon the shaft 35 is a roller 37. The container 36 is positioned a short distance below the track member 16. The roller 37 is adapted to be lifted by the raised portions of the cams 28a and to be brought into engagement with the pad 18 formed on the under side of the carriage 17, and transfer adhesive substance from the container 36 in a thin layer on the under side of said pad 18.

The main shaft 27 is driven by a suitable motor 38 through a gear and shaft arrangement 39, which connects to the shaft 27 between one of the wheels 28 and the adjacent bracket frame 1e, as shown in Figs. 2, 3, and 11.

Mounted adjacent to and on the inside of one of the bracket frames 1e is a can conveyor operating cam 40. Supported between the bracket frames 1e, above and rearwardly of the shaft 27, is a lever supporting shaft 41. Mounted upon this shaft intermediate its ends is a can conveyor lever 42, the one end of which is provided with a roller 42a adapted to roll on the periphery of the cam 40. The other arm of said lever 42 is secured to the before-mentioned spring 13, which actuates the ratchet wheel 9, and in turn causes the conveyor chains 3 to shift the can C between the can clamps 23.

Mounted adjacent to the cam 40 is a platen raising cam 43. A platen raising lever 44 is supported on the shaft 41, and is provided with a depending arm 44a, having a roller 44b at the end thereof adapted to engage the rear side of the cam 43. The other arm 44c of the platen raising lever 44 engages the under side of a platen lifting means 45, which extends upwardly through the cross member 1d and is secured to the platen 26.

As shown in Fig. 3, the platen lifting means comprises a pair of telescoping cylinders 45a and 45b, which are limited in their relative movement and are resiliently held in their extended relation by an inner spring 45c.

A second or outer spring 45d, extending between the member 45b and the under side of the bearing provided in the cross member 1d, tends to hold the platen in its lowered position. Upward movement of the arm 44c causes the platen to rise against the action of the outer spring 45d until the wrapping paper has engaged the pad 18, with suitable pressure, whereupon the cylinders 45a and 45b telescope against the action of the spring 45c.

When there is no can being fed by the conveyor 3, it is undesirable to have the platen 26 operate. Its operation is prevented by a throwout mechanism.

A portion of the guard wall 2b is omitted and an arm member 46 secured at its rear end to a shaft 47 is substituted. The shaft 47 extends downwardly through a suitable bearing provided in the table 2, to a bracket extending out from the horizontal portion of one of the bracket frames 1e. To this lower end of the rod is secured a second arm 48 which joins a lever 49. This lever 49 is journaled intermediate its ends upon one of the bracket frames 1e. The other end of the lever 49 is connected through a link member 50 to an arcuate slot 44d, having its center of curvature at the fulcrum point of the lever 44, and extending outwardly from the depending arm 44a thereof, as shown best in Figs. 2 and 3. The depending arm 44a of the lever 44 is hinged at its upper end, as shown in Fig. 3, so an arcuate movement of the lever 46, causes the arm 44a to swing out of or into engagement with the cam 43. The slot 44d permits the lever 44 to pivot about its axis when acted upon by the cam 43. The side of the cam toward which the arm 44a is swung is beveled so that said arm 44a may readily return to its operating position.

A spring 49a joins the lever 49 and tends to shift the roller 44b of the lever 44 out of engagement with the cam 43. The spring is prevented from doing this by the arm 47 whenever a can C is between said arm and the opposite guard rail 2c, as shown best in Fig. 5.

Supported by a suitable framework 1j, above the upper frame 1e, is a second pair of conveyor chains 51, which are connected together by a plurality of small buckets 51a arranged in suitable spaced relation, each bucket adapted to receive a key K for opening the can C. The conveyor chains 51 pass over the conveyor sprockets 52 at their forward ends. These conveyor sprockets are positioned substantially over the extended ends of the feeder portion 2d. The conveyor sprockets 52 are mounted on a shaft 53 which extends laterally and is provided with a driven sprocket 54, which is linked with a drive sprocket 55, through a chain 56. The drive sprocket 55 is mounted on the shaft 7.

The shaft 53 is provided with a suitable clutch means 57. The clutch means 57 is operated by a lever 58, which is linked with an upward extension of the rod 47. Inward movement of the arm 46 when no can is opposite causes the clutch 57 to be disengaged, thereby preventing the discharge of a key.

Keys from the bucket 51a drop into a hopper 59, mounted below and forward of the conveyor 51 and in centered relation over the platen 26. The hopper is supported between a pair of downwardly extending rods 60, which may be offset to clear the carriage shifting arms 22, and extend through suitable bearings supported from the cross member 1c. The rods 60 connect through a pair of springs 61 to a common lever 62 supported by the bracket frame 1e.

A hopper shifting cam 63 is mounted on the main shaft 27. Said cam is adapted to engage a roller 62a of the lever 62 so as to shift said lever downwardly and cause said hopper to descend until in engagement with the platen. The hopper is returned to its normal position by springs 64 extending between the framework 1j from the upper end of the rod 60 which extends therethrough, as shown in Fig. 3.

The discharge passage 59a of the hopper is widened at its ends so as to receive the heads or handles of the keys. Surrounding the discharge end portion of the hopper is a telescoping member 59b which conforms in shape to the discharge passage 59a. The lower end of the telescoping member is provided with a trapdoor 59c, which forms the one arm of a lever pivoted at the one lower side of said telescoping member 59b. The other arm 59d of said lever extends downwardly and is adapted to engage the upper surface of the wrapping paper which is supported on the platen 26. Upward movement of the arm 59d opens the trapdoor 59c and allows a key to be placed upon the uppermost paper in the platen 26.

When the cam 63 through the means of the lever 62, springs 61 and rods 60 lowers the hopper, said hopper deposits a key K upon the uppermost sheet of wrapping paper P directly beneath the place where the can C is to be positioned in the carriage. This operation takes place just before the carriage has reached the end of its rearward journey. Thus, when the platen moves up to engage the pad 18, a key is resting thereupon and rides upon said sheet of wrapping paper and beneath the can C when said carriage is moved forward to the wrapping mechanism.

Figure 6 shows a sheet of paper adhering to the under side of the carriage, with the key thereon.

Disposed between the side members of the upper frame 1b is a wrapping table 65. The center of this table is positioned rearwardly of the main shaft 27 a distance slightly less than the radius of the carriage driving wheels 28, as shown best in Fig. 3.

Supported near the forward side of the wrapping table 65, in spaced apart relation to each other, is a pair of posts 66, which support the forward ends of the tracks 16.

A substantially rectangular recess 65a is formed in the wrapping table 65. This recess is positioned so as to be centered below a can held by the clamping members 23 when the carriage is at the forward end of its travel. The recess 65a is slightly greater than the width of the wrapping paper, and slightly wider than the width of the can C, as shown in Figs. 1, 3, 12 and 16.

Centered relative to the recess 65a, is a downwardly extending hollow boss portion 65b, in which is adapted to reciprocate a linking rod 67. The linking rod extends vertically and upwardly through the boss portion 65b, and forms a sliding joint with a downwardly extending sleeve 68a which forms a part of the lower plunger 68. The plan of the lower plunger 68 conforms substantially to the shape of the can to be wrapped. A spring 69 surrounds the portion of the linking rod 67 within the boss portion 65b and extends between the lower end of the sleeve portion 68a and a collar 67a provided on the rod 67, as shown in Fig. 13. The spring 69 forces the collar 67a against the lower restricted end of the boss portion 65b and presses upwardly on the sleeve portion 68a so as to hold the rod 67 and lower plunger 68 in extended relation. A second spring 70 extends between the lower end of the boss portion 65b, and a shoulder 67b, formed around the rod 67 at its lower end. The spring 70 tends to hold the linking rod 67 and plunger 68 in their lowered position, as shown in Figs. 3 and 13.

Pivotally secured to the linking rod 67 is the one end of a lower plunger actuating lever 71. Said lever extends horizontally, forwardly, and the other end thereof is rotatably secured to a bracket extending out from a cross member 1k of the main frame 1.

Positioned intermediate the ends and below the lever 71 at approximately the same level as the main shaft 27, is a cam shaft 72. A roller 71a mounted on the under side of and intermediate the ends of the lever 71, is adapted to roll on the cam 73. The cam 73 is provided with a single lobe which raises the lower plunger 68 at predetermined intervals.

Extending downwardly from the wrapping table 65, on either side of the boss 65b, is a pair of other boss portions 65c, which are hollow. Mounted just clear of the end of the lower plunger 68 is a pair of lower flap-folding rollers 74. Each roller extends the width of the lower plunger 68 and is supported at its ends by a yoke portion 75a which forms the upper end of a rod 75.

Each rod 75 extends downwardly through the corresponding boss portion 65c and forms a sliding joint with a connecting rod 76. The rods 75 and the respective connecting rods 76 are held in extended relation to each other by compensating springs 77. The connecting rods 76 are held in extended lowered relation to the boss portions 65b by means of return springs 78.

The compensating springs 77 allow the full movement of the connecting rods 76 even though an obstruction should stop the upward movement of the rollers 74 and the rods 75 connected thereto. Return springs 78 tend to maintain the rollers 74 in their lowered position shown in Fig. 13.

The lower ends of the connecting rods 76 are joined to the one end of a pair of levers 79, which extend horizontally and forwardly and are supported on either side of the lever 71 by brackets extending from the cross members 1k. The levers 79 are similar in construction to the lever 71, and are provided with rollers 79a which are adapted to travel on cams 80 mounted on the cam shaft 72 on either side of, and in spaced relation to said cam 73.

The working table 65 is provided with two sliding plate supporting portions 65d which extend from the forward and rear sides of the depression 65a.

Mounted on top of the wrapping table 65, is a pair of can-enveloping sliding plates 81, which are adapted to be simultaneously shifted towards each other and over the lower plunger at a height just sufficient to clear the top of a can resting thereupon. The ends of the sliding plates 81 adjacent the depression 65a are increased in width until they extending the full length of the forward and rear sides of the depression 65a, as shown best in Fig. 12. The working ends 81a of the slide plates 81 are enlarged and rounded so as to engage the wrapping paper without tearing it.

The sliding plate supporting portions 65d of the working table 65, which extend forwardly and rearwardly of the depression 65a are provided with slots 65e, through which project downwardly extending lugs 81d of the sliding plates 81, as shown best in Figs. 3 and 15.

Rotatably secured to the forward sliding plate 81 is an actuating lever 82 therefor, which extends downwardly and past the forward side of the cam shaft 72. Near its lower end, the actuating lever 82 is mounted on a lever shaft 83, which extends in parallel disposed relation to the cam shaft 72, and is positioned forwardly and downwardly from said cam shaft 72, as shown in Figs. 3 and 19. Positioned on the rear side of the lever 82, a short distance above its fulcrum is a roller 82a, which engages the forward side of a sliding plate actuating cam 84. As shown in Fig. 19, the sliding plate actuating cam 84 is mounted adjacent to and on the left-hand side of the lower plunger actuating cam 73. The lever 82 is offset near its upper portion so as to join the forward sliding plate 81 in centered relation thereto.

The rear sliding plate 81 is joined to a rear sliding plate lever 85, which extends downwardly and slightly forwardly to the base frame 1a of the main frame 1, and is supported on a shaft 86 extending between the side members of said main frame.

A link member 87 is joined at its one end to the rear sliding plate lever 85 adjacent to the fulcrum of said lever. The forward end of the link member 87 is joined to the lower end of the forward sliding plate lever 82 below its fulcrum. A tension spring 88 extends between the lower ends of the lever 82 and the rear member of the lower frame 1a of the main frame 1. The lug 81d of the rear sliding plate is provided with a horizontally extending slot 81e, which permits slight movement of the rear lever 85 before causing the rear sliding plate to shift. This enables the forward sliding plate to commence its operation before the rear sliding plate.

The side margins of each sliding plate supporting portion 65d are provided with forwardly and rearwardly extending channels 65f in which are mounted sliding bars 89. The channels 65f are so positioned that the sliding bars 89 may be shifted forwardly and rearwardly toward the transverse axis of the depression 65a.

The channels of each sliding plate support are positioned far enough apart so that the sliding bars thereof clear the ends of a can mounted upon the lower plunger 68. The sliding bars 89 are adapted to fold the corners on the wrapping paper.

The rear set of sliding bars 89 is connected by a flat linking bar which extends over the rear sliding plate 81. Likewise, the forward sliding bars 89 are connected together by another linking bar 90. Each sliding bar is provided with an outwardly extending arm 89a which extends out cut away portions 65g provided in certain side walls of the channels 65f, and which has a depending portion 89b. Each depending portion 89b is connected to the one end of a link member 91. The link members of oppositely disposed pairs of sliding bars 89 are rotatably secured together and to an arm 92a of a connecting means 92.

The connecting means 92 has two arms 92a which form a bifurcated upper portion of said coupling means 92. Thus, the four sliding bars and their linking members 91 may be simultaneously operated by the coupling means 92. The lower portion of the coupling means 92 is provided with a rod 92b, which fits inside of a sleeve member 92c and is held in retracted relation thereto by means of a spring 92d. The lower end of the sleeve 92c is provided with a fitting 92e which enables it to be rotatably secured to a lever 93 which is the actuating lever for the corner-folding sliding bars 89. The lever 93 extends horizontally and forwardly underneath the cam shaft 72 and is rotatably secured at its forward end to the lever shaft 83. Intermediate its ends on its upper side, the lever 93 is provided with a roller 93a, which is adapted to engage the under side of the actuating cam 94 for the corner-folding sliding bars 89. In the structure shown, the cam 94 is adjacent to and on the left-hand side of the right-hand end-folding roller actuating cam 80.

The sliding plates 81 and 89 are enclosed by cover plates 95, which fit over the top of the two sliding plate supporting portions 65d, as shown best in Figs. 3, 12, 13, 15, 16 and 17.

Mounted vertically above the lower plunger 68 is an upper plunger 96 which is supported from an upwardly extending rod 97. The rod 97 extends upwardly through a bearing provided in a cross member 1m supported above the wrapping table 65 and track 16, so as to clear the carriage 17.

Supported forwardly of the cross member 1m at the same level as the cross member, is a cross member 1n. Supported between the cross members 1m and 1n, are horizontally extending longitudinal members 1p. The longitudinal members 1p support a shaft 98 which extends transversely therebetween, as shown in Figs. 1 and 3. Surrounding the shaft 98 is a second shaft 99. Journaled intermediate its ends upon the second shaft 99 is a lever 100 which is joined at its rear end to the upper end of the rod 97. The forward end of the lever 100 joins a second downwardly extending rod 101, which is journaled in the forward upper cross member 1n. A spring 102 extends between the cross member 1n and the forward arm of the lever 100 and tends to hold the upper plunger 98 in its raised position. The rod 101 joins a continuing rod 103 and forms a sliding joint 104 therewith. The rods 101 and 103 are resiliently held in their extended relation by a spring 105. The continuing rod 103 extends downwardly through a bearing provided in the cross member 1k and is joined to the forward end of a lever 106 rotatably mounted intermediate its ends upon the lever shaft 83. The other end of the lever 100 is provided with a roller 106a, which engages the upper plunger operating cam 107. The cam 107 is mounted between the cams 73 and 94, as shown in Fig. 19.

Slidably mounted in bearings supported in the cross member 1m, on either side of the plunger rod 97, is a pair of rods 108. The lower ends of the rods 108 are secured to upper end flap-folding members 109. There are two of these members which are adapted to depend just clear of the end of the upper plunger 96 and fold the upper flap of paper extending over the end of a can positioned between the two plungers 68 and 96. The members 109 are provided with rounded lower working ends 109a, as shown in Fig. 13. One of the rods 108 is secured to the rear arm of an upper lever 110. The lever 110 is secured to the end of the second shaft 99 and adapted to rotate upon the inner shaft 98. The other arm of the lever 110 extends forwardly of its fulcrum point from the shaft 98 and overhangs the cross member 1n. The forward end of the upper lever 110 is connected through a link means 111 to the one arm of a lower lever 112. The linking means 111 is similar in construction to the linking means which comprises the upper rod 101, spring 102, continuing rod 103, coupling 104, and spring 105. The lever 112 is similar to the lever 106 and is rotatably mounted intermediate its ends upon the lever shaft 83. The other arm of the lever 112 is provided with a roller 112a which is adapted to engage a cam 113, mounted on the cam shaft 72 between the cams 79 and 84.

The other rod 108 is connected to an arm 114, shown in Fig. 1, which is secured to the other end of the second shaft 99. Thus, oscillating of the lever 110 causes a like oscillation of the lever 114.

The one end wall of the depression 65a of wrapping table 65 is reduced in height and forms the entrance to a chute 65h, which extends downwardly and outwardly and is supported by the adjacent side member of the upper frame 1b.

The other end of the depression 65a is supported relative to the adjacent side member of the upper frame 1b, by an extending portion 65j which is flat on its upper side except for a wide shallow channel 65k intersected by a slot 65m extending longitudinally therewith intermediate its ends. The channel or recess 65k intersects the end of the depression 65a and is provided with a cut away portion 65n which receives the head of an ejecting plunger 115. The plunger head 115 is connected to a bar 116, which fits in and conforms to the shape of the channel 65k. A suitable plate 117 holds the bar 116 in place. Secured to the under side of the bar 116, so as to extend through the slot 65n, is an arm member 118.

Rotatably secured to the extended end of the arm 118, is the one end of a lever 119 which extends forwardly adjacent to the one side member of the upper frame 1e, and is rotatably secured thereto intermediate its ends. The other arm of the lever 119 extends inwardly from the supporting side member and is pivotally connected to one arm of a second lever 120, as shown in Figs. 1 and 20.

The second lever 120 is rotatably secured intermediate its ends to a bracket extending from the cross member 1a. The other arm of the lever 120 is provided with a roller 120a, which engages the forward side of a cam 121 mounted on the cam shaft 72, as shown in Figs. 2, 19, and 20.

A spring 122 yieldably holds the lever 120 in contact with the cam 121. The spring 122 provides the force for operating the ejection plunger 115. The cam 121 merely holds the ejecting plunger in its retracted position against the action of the spring 122 until a minor point in the cam is reached, whereupon the spring 122 causes the ejecting lever to move across the upper side of the lower plunger 68, and push the wrapped can into the chute 65h.

The cam shaft 73 is provided with a sprocket wheel 123 which is driven to a chain 124 by a second sprocket wheel 125 mounted on the main shaft 27, as shown in Fig. 2. It is preferred that the shafts 27 and 72 revolve at the same speed.

The operation of my machine is as follows:

The sardine cans are placed on the conveyor 3. Keys are deposited in the various buckets 51a of the conveyor chains 51. At a predetermined interval during the time in which the carriage is at rest, at the rearward end of its journey, the cam 40 actuates the lever 42 and, through the connecting mechanism, causes the conveyor chains to move forward a distance equal to the width of the can plus the distance separating the several cans, as shown in Fig. 3. This movement forces the end can between the clamps 23. The same movement causes a key K to be deposited in the hopper 59.

Previous to this operation, while the carriage is at the other end of the travel, or at least clear of the hopper and platen, the cam 63 through the link mechanism causes the hopper to descend and deposit a key upon the uppermost sheet of paper on the platen.

During the preceding rearward journey of the carriage member, adhesive material has been coated upon the pad 18 by the adhesive spreading roller 37; this roller being acted upon by the cam rims 28a of the carriage driving wheels 28. Just before or just after a can C has been positioned in the carriage, (in the structure shown, just after this operation) the cam 43 operates the lever 44 and causes the platen to rise and press the upper sheet of paper P thereon against the pad 18 which has been previously coated with adhesive.

It will be noted that by reason of the diameter of the carriage driving wheels being greater than the length of travel of the carriage, that the carriage is caused to pause at each end of its travel a sufficient time for permitting other mechanism to function.

After receiving the wrapping paper and the can, the carriage moves forwardly to its forward position, in which the can is centered over the depression 65a in the wrapping table 65, which is the position shown by the diagrammatical view, Fig. 23. When the carriage has reached this position, the lower plunger, by means of its cam, is shifted upwardly so as to clamp the wrapping paper against the under side of the can. At the same time, the upper plunger is moved downwardly by the action of its cam 107.

As soon as the two plungers 68 and 96 have clamped the can, both plungers move downwardly to the position shown in Fig. 24, peeling the wrapping paper away from the under side of the carriage. As soon as the paper is clear of the carriage, said carriage starts on its rearward journey to take up another can. As soon as the paper is clear of the carriage, the upper plunger raises again, as shown in Fig. 25, while the sliding plates 81 are shifted towards each other folding the flap (a) over the top of the can.

By means of the horizontal slot 81c provided in the lug 81b in the rear sliding plates, the forward sliding plate comes into action first so that the rear flap (a) is positioned on top of the forward flap (b). As the rear flap (a) is covered with adhesive across its end, it sticks down upon the forward flap (b).

As soon as the sliding plates have accomplished their function, the upper plunger 96 again descends, pressing the flaps (a) and (b) into firm relation to each other.

As soon as the can is again clamped between the two plungers, the four corner-folding sliding bars 89 bend the corners (c) of the paper inwardly against the ends of the can as shown in Figs. 26A and 26B. When these sliding bars 89 return to their normal position, the upper clamp folding members 109 descend and fold the upper flaps (d) against the end of the can, as shown in Fig. 27. As soon as this operation is accomplished and the flap-folding members 109 have moved clear, the lower end flap-folding rollers 74 move upwardly, rolling the lower end flaps (e) against the upper end flaps (d) and completely sealing the can, as shown in Fig. 28. As the side margins of the paper are coated with adhesive, the corner portions (c) when folded against the can stick in position. Also, the upper flaps (d) stick against the ends of the can, and the lower flaps (e) stick against the upper flaps (d).

As soon as the can is wrapped, the ejecting plunger 115 is actuated and pushes the can off the lower plunger 68 and onto the chute 65h.

During this folding operation, the carriage member has moved backwardly over the adhesive spreading roller, has received a key and second sheet of wrapping paper, and is on its forward journey with the next can.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a can-wrapping machine, a can-wrapping table, means for depositing a can and wrapping paper therefor upon said table, means for folding opposite extended portions of said paper over said can, corner-folding means, upper end flap-folding means, lower end flap-folding means, said several means arranged to operate in consecutive order, and key-placing means arranged to deposit a key so as to be enclosed within said paper.

2. In a can-wrapping machine, a can-wrapping table, means for depositing a can and wrapping paper therefor upon said table, means for folding opposite extended portions of said paper over said can, corner-folding means, upper end flap-folding means, lower end flap-folding means, said several means arranged to operate in consecutive order, key placing means arranged to deposit a key so as to be enclosed within said paper, and cam and link mechanism for each before-described means arranged to cause operation thereof in predetermined succession.

3. In a can-wrapping machine, a can-wrapping table, means for depositing a can and wrapping paper therefor upon said table, means for folding opposite extended portions of said paper over said can, corner-folding means, upper end flap-folding means, lower end flap-folding means, said several means arranged to operate in consecutive order, key-placing means arranged to deposit a key so as to be enclosed with said can by said paper, cam and link mechanism for each means arranged to cause operation thereof in predetermined succession and resilient means co-operating with said several cam and link mechanisms, said resilient means being yieldable to force greater than that necessary to perform the wrapping operation.

4. In a machine of the class described, a carriage apparatus, an adhesive spreading means arranged to coat portions of said carriage with adhesive, a platen for pressing wrapping paper against the adhesive coated portions of said carriage so as to be retained thereby, a can conveyor mechanism for depositing a can upon said carriage, means for removing said paper with said can from said carriage, and mechanism for folding said wrapping paper about said can.

5. In a machine of the class described, a carriage apparatus, an adhesive spreading means arranged to coat portions of said carriage with adhesive, a platen for pressing wrapping paper against the adhesive coated portions of said carriage, so as to be retained thereby a key-placing means arranged to deposit a can-opening key upon said wrapping paper, a can conveyor mechanism for loading a can upon said carriage contiguous to said key and wrapping paper, means for removing said paper, key and can from said carriage, and mechanism for folding said wrapping paper about said can.

6. In a machine of the class described, a carriage apparatus, an adhesive spreading means arranged to coat portions of said carriage with adhesive, a platen for pressing wrapping paper against the adhesive coated portions of said carriage, so as to be retained thereby a can conveyor mechanism for depositing a can upon said carriage in certain relation to said wrapping paper, mechanism for operating said platen, and throwout means connected with said conveyor for disengaging the mechanism connected with said platen when no can is ready for loading upon said carriage, means for removing said paper with said can from said carriage, and mechanism for folding said wrapping paper about said can.

7. In a machine of the class described, a carriage apparatus, an adhesive spreading means arranged to coat portions of said carriage with adhesive, a platen for pressing wrapping paper against the adhesive coated portions of said carriage, a key-placing means arranged to deposit a can-opening key upon said wrapping paper, a can conveyor mechanism for loading a can upon said carriage above said key and wrapping paper, mechanism for operating said platen, mechanism for operating said key-placing means, throwout means connected with said conveyor for disengaging the operating mechanisms from said platen and key-placing means when no can is ready for loading upon said carriage, means for removing said paper, key and can from said carriage, and mechanism for folding said wrapping paper about said can.

8. In a machine of the class described, a carriage apparatus, an adhesive spreading means arranged to coat portions of said carriage with adhesive, a platen for depositing wrapping paper upon the adhesive coated portions of said carriage, a can conveyor mechanism for depositing a can upon said carriage, a can-wrapping table arranged to receive a can, and paper from said carriage, a pair of plungers engageable with opposite sides of said can for removing said can and paper from said carriage, sliding plate members arranged to fold opposite ends of said paper over said can, sliding bar means for folding contiguous portions of said paper against the corners of said can, flap-folding members arranged to fold the upper end flaps of said paper, flap-folding rollers arranged to fold the under end flaps of said paper, and ejector means for removing said can from said wrapping table.

9. In a machine of the class described, a carriage apparatus, an adhesive spreading means arranged to coat portions of said carriage with adhesive, a platen for pressing wrapping paper against the adhesive coated portions of said carriage, so as to be retained thereby a key-placing means arranged to deposit a can-opening key upon said wrapping paper, a can conveyor mechanism for loading a can upon said carriage above said key and wrapping paper, a pair of plungers, said carriage arranged to shift said can, paper and key between said plungers, said plungers adapted to remove, said can, key and paper from said carriage, sliding plate members arranged to fold opposite ends of said paper over said can, sliding bar means for folding corner portions of said paper against the corners of said can, flap-folding members arranged to fold the upper end flaps of said paper, flap-folding rollers arranged to fold the under end flaps of said paper, and ejector means for removing said can from said wrapping table.

10. In a machine of the class described, a carriage apparatus, an adhesive spreading means arranged to coat portions of said carriage with adhesive, a platen for affixing wrapping paper to the adhesive coated portions of said carriage a can conveyor mechanism for loading a can upon said carriage, mechanism for operating said platen, throwout means connected with said conveyor for disengaging said operating mechanism from said platen when no can is ready for loading upon said carriage, a pair of plungers for removing said can and paper from said carriage, sliding plate members arranged to fold opposite ends of said paper over said can, sliding bar means for folding corner portions of said paper against the ends of said can, flap-folding members arranged to fold the upper end flaps of said paper, flap-folding rollers arranged to fold the under end flaps of said paper, and ejector means for removing said can from said wrapping table.

11. In a machine of the class described, a carriage apparatus, an adhesive spreading means arranged to coat portions of said carriage with adhesive, a platen for pressing wrapping paper against the adhesive coated portions of said carriage, a key-placing means arranged to deposit a can-opening key upon said wrapping paper, a can conveyor mechanism for loading a can upon said carriage, mechanism for operating said platen, mechanism for operating said key-placing means, throwout means connected with said conveyor for disengaging the operating mechanisms from said platen and key-placing means when no can is ready for loading upon said carriage, a pair of plungers for removing said can, key and paper from said carriage, sliding plate members arranged to fold opposite ends of said paper over said can, sliding bar means for folding certain portions of said paper against the ends of said can, flap-folding members arranged to fold the upper end flaps of said paper, flap-folding rollers arranged to fold the under end flaps of said paper, and ejector means for removing said can from said wrapping table.

12. In a machine of the class described, a carriage, an adhesive spreading means arranged to coat the bottom of said carriage along its side margins and one end, a platen means arranged to support a multiplicity of wrapping paper sheets and to press the uppermost one of said sheets against the adhesive coated portions of said carriage, can clamping means mounted on said carriage in substantially centered relation to said platen means, can feeding means for depositing cans one at a time in engageable relation to said can clamping means, means for removing said paper and can from said carriage, and wrapping means arranged to fold and seal said paper around said can.

13. In a machine of the class described, a carriage, an adhesive spreading means arranged to coat the bottom of said carriage along its side margins and one end, a platen means arranged to support a multiplicity of wrapping paper sheets, a key-depositing means for placing keys one at a time upon the uppermost sheet of said wrapping paper, mechanism for shifting said platen means until the uppermost sheet of wrapping paper thereon is pressed against the adhesive coated portions of said carriage, can clamping means mounted on said carriage in substantially centered relation to said platen means, can feeding means for depositing cans one at a time in engageable relation to said can clamping means, means for removing said paper, can and key from said carriage, and wrapping means arranged to fold and seal said paper around said can and key.

14. In a machine of the class described, a carriage, an adhesive spreading means arranged to coat the bottom of said carriage along its side margins and one end, a platen means arranged to support a multiplicity of wrapping paper sheets and to press the uppermost one of said sheets against the adhesive coated portions of said carriage, can clamping means mounted on said carriage in substantially centered relation to said platen means, can feeding means for depositing cans one at a time in engageable relation to said can clamping means, release means for preventing the action of said platen means when a can is not fed into said clamping means, means for removing said paper and can from said carriage, and wrapping means arranged to fold and seal said paper around said can.

15. In a machine of the class described, a carriage, an adhesive spreading means arranged to coat the bottom of said carriage along its side margins and one end, a platen means arranged to support a multiplicity of wrapping paper sheets, a key-depositing means for placing keys one at a time upon the uppermost sheet of said wrapping paper, mechanism for shifting said platen means until the uppermost sheet of wrapping paper thereon is pressed against the adhesive coated portions of said carriage, can clamping means mounted on said carriage in substantially centered relation to said platen means, can feeding means for depositing cans one at a time in engageable relation to said can clamping means, release means for preventing the action of said platen means and said key-placing means when a can is not fed into said clamping means, means for removing said paper and can from said carriage, and wrapping means arranged to fold and seal said paper around said can.

16. In a machine of the class described, a carriage, an adhesive spreading means arranged to coat the bottom of said carriage along its side margins and one end, a platen means arranged to support a multiplicity of wrapping paper sheets and to press the uppermost one of said sheets against the adhesive coated portions of said carriage, can clamping means mounted on said carriage in substantially centered relation to said platen means, can feeding means for depositing cans one at a time in engageable relation to said can clamping means, a pair of plungers for removing said can and paper from said carriage, sliding plate members arranged to fold opposite ends of said paper over said can, sliding bar means for folding corner portions of said paper against the ends of said can, flap-folding members arranged to fold the upper end flaps of said paper, flap-folding rollers arranged to fold the under end flaps of said paper, and ejector means for removing said can from said wrapping table.

17. In a machine of the class described, a carriage, an adhesive spreading means arranged to coat the bottom of said carriage along its side margins and one end, a platen means arranged to support a multiplicity of wrapping paper sheets and to press the uppermost one of said sheets against the adhesive coated portions of said carriage, can clamping means mounted on said carriage in substantially centered relation to said platen means, can feeding means for depositing cans one at a time in engageable relation to said can clamping means, a pair of plungers for removing said can and paper from said carriage, sliding plate members arranged to fold opposite ends of said paper over said can, sliding bar means for folding corner portions of said paper against the corners of said can, flap-folding members arranged to fold the upper end flaps of said paper, flap-folding rollers arranged to fold the under end flaps of said paper, and ejector means for removing said can from said wrapping table.

18. In a key-placing and can-wrapping machine, conveyor means for cans, conveyor mechanism for can opening keys, positioning means for wrappers, a carriage apparatus for receiving a can, key and wrapper in assembled relation, and means for wrapping said wrapper around both said key and said can.

19. In a key-placing and can-wrapping machine, a carriage apparatus, adhesive receiving areas provided thereon, an adhesive supplying means arranged to apply adhesive to said areas, means for positioning a wrapper against said adhesive coated areas, conveyor means for cans, conveyor mechanism for can opening keys, said conveyor means and mechanism arranged to feed a can and key, respectively, into said carriage and in assembled relation with said wrapper, and means for wrapping said wrapper around both said can and said key.

20. In a key-placing and can-wrapping machine, a can feeding means, a key feeding means, a wrapper feeding means, and a wrapping apparatus arranged to receive a can, key and a wrapper from said several means, said can key and wrapper being supplied thereto in superposed contiguous relation whereby upon action of said wrapper apparatus, both said key and said can are within said wrapper.

21. In a key-placing and can-wrapping machine, a can feeding means, a key feeding means, a wrapper feeding means, mechanism for applying adhesive to portions of said wrapper, said feeding means arranged to deliver a can and a key and a wrapper into assembled relation, and means for wrapping said wrapper in sealing relation around said can and key.

In testimony whereof, I have hereunto set my hand at San Diego, California, this 28th day of September, 1929.

JOSEF F. MOSE.